United States Patent [19]

Zimmerer et al.

[11] 4,384,676
[45] May 24, 1983

[54] TRAVELING WEIR

[75] Inventors: William P. Zimmerer, Fresno, Calif.; David A. Siekmeier, Columbus, Nebr.

[73] Assignee: Lindsay Manufacturing Corporation, Lindsay, Nebr.

[21] Appl. No.: 288,461

[22] Filed: Jul. 30, 1981

Related U.S. Application Data

[63] Continuation-in-part of Ser. No. 98,853, Nov. 30, 1979, abandoned.

[51] Int. Cl.³ .................... A01G 25/09; B05B 3/18
[52] U.S. Cl. .................................................. 239/179
[58] Field of Search .................. 239/178–182, 239/184, 193, 709, 711, 721; 405/36, 37, 39–41, 87, 88, 91, 98

[56] References Cited

U.S. PATENT DOCUMENTS

| | | | |
|---|---|---|---|
| 1,107,119 | 8/1914 | Searle | 239/179 |
| 2,718,433 | 9/1955 | Poynor et al. | 239/179 |
| 2,763,992 | 9/1956 | Rothenberger | 405/90 |
| 2,851,305 | 9/1958 | Martinez | 239/179 |
| 2,880,937 | 4/1959 | King | 239/181 |
| 3,104,821 | 9/1963 | Anderson | 239/179 |
| 3,108,440 | 10/1963 | Anderson | 239/179 X |
| 3,303,655 | 2/1967 | Loomis | 239/181 X |
| 3,303,655 | 2/1967 | Loomis | 239/181 X |
| 4,222,520 | 9/1980 | Melcher | 239/179 X |

FOREIGN PATENT DOCUMENTS 758703 1/1934 France .................. 405/90

*Primary Examiner*—Johnny D. Cherry
*Attorney, Agent, or Firm*—Kinzer, Plyer, Dorn & McEachran

[57] ABSTRACT

A weir suitable for use in an irrigation water supply ditch. The weir controls water flow to create a sufficient pool of water for pick-up by an irrigation machine. The weir has a rigid bulkhead which is generally shaped to match the contour of the ditch. The bulkhead is supported such that it is not in contact with the ditch. A seal member attached to the bulkhead fills the gap between the bulkhead and the ditch surface, to prevent water flow underneath the weir. This arrangement of a rigid piece coupled with a flexible seal allows the weir to move in either direction along the ditch without becoming snagged on obstructions in the ditch.

17 Claims, 6 Drawing Figures

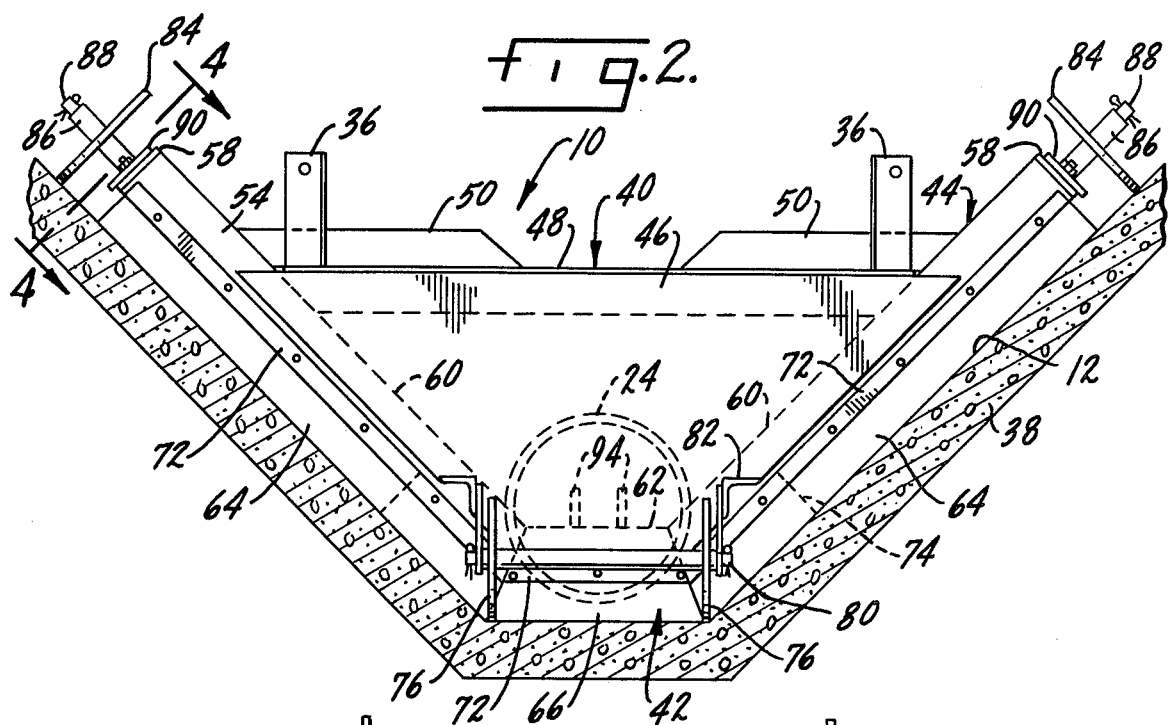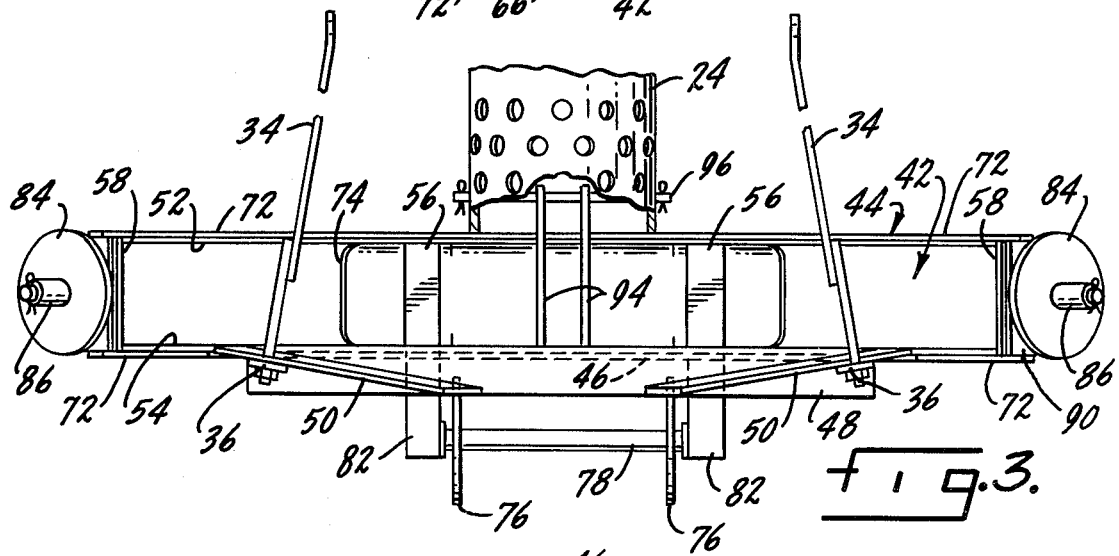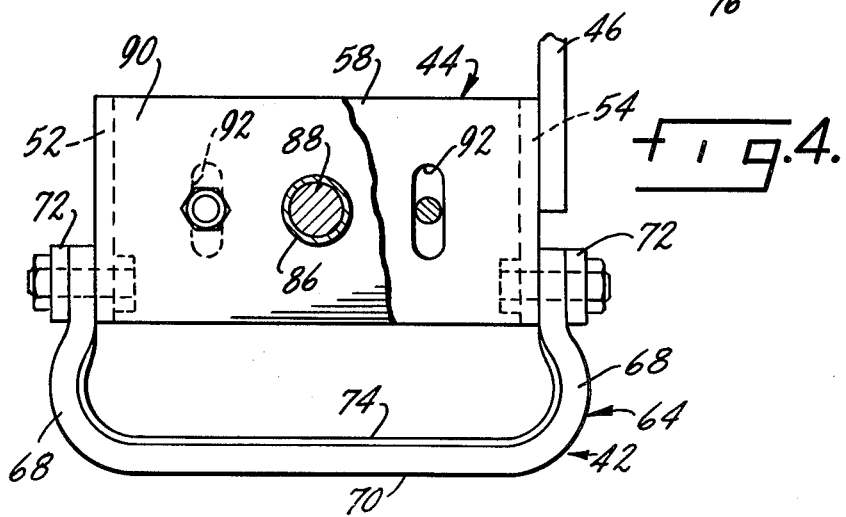

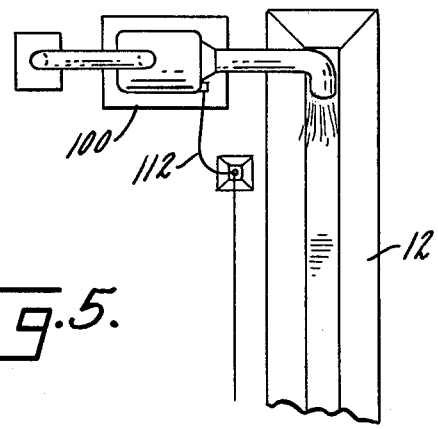
fig.5.
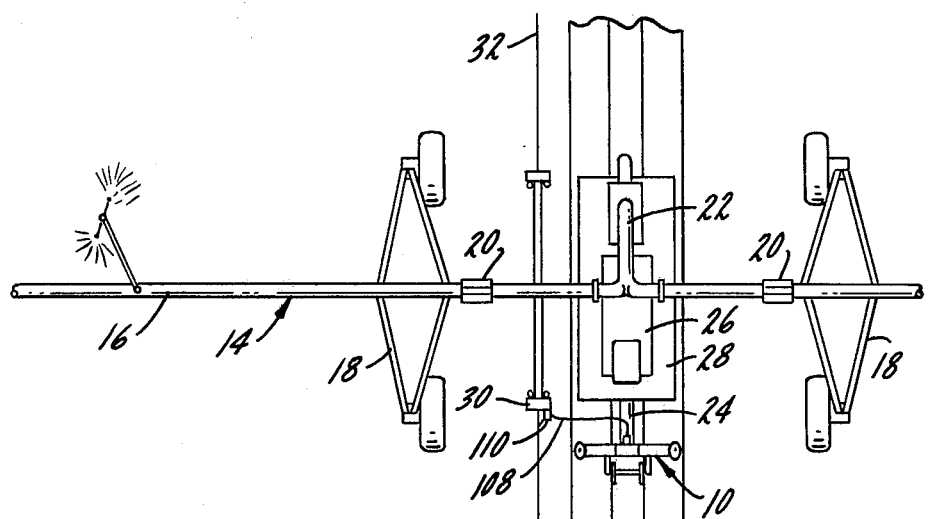
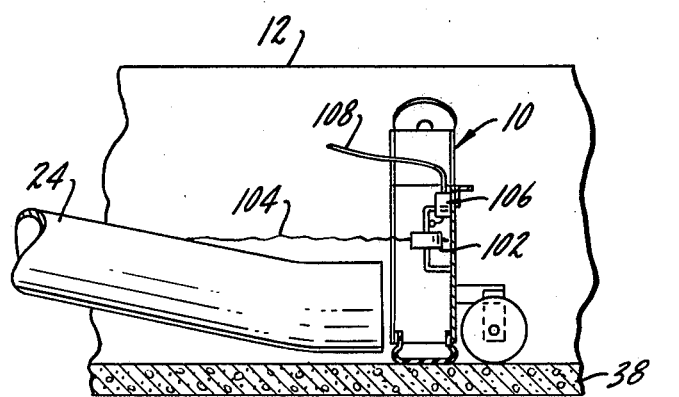
fig.6.

TRAVELING WEIR

SUMMARY OF THE INVENTION

This application is a continuation-in-part of application Ser. No. 098,853, filed Nov. 30, 1979, now abandoned.

This invention is directed to a flow control apparatus for irrigation ditches. It is specifically concerned with controlling water flow in a ditch which supplies water to a traveling irrigation machine.

Accordingly, a primary object of the present invention is a weir for controlling water flow in an irrigation water supply ditch.

Another object is a weir which is lightweight yet sturdy so it can be moved along the length of a ditch.

Another object is a weir having improved sealing means for preventing water flow under the weir.

Another object is a weir having a seal which is pressure balanced in that water pressure tending to cause leakage underneath the weir is also responsible for urging the seal into engagement with the ditch.

Another object is a weir having a seal which can be easily replaced when worn.

Another object is a weir whose supporting means are adjustable to vary the position of the weir in the ditch.

Another object is a weir which is capable of moving in both directions along an irrigation ditch.

Another object is a weir which can be used with automatic controls which regulate the inflow of water into the ditch.

Other objects may appear from time to time in the following specification and drawings.

BRIEF DESCRIPTION OF THE DRAWINGS

FIG. 2 is an elevation view of the weir, from the downstream side of the ditch.

FIG. 3 is a top plan view of the weir.

FIG. 4 is a section on an enlarged scale taken along line 4—4 of FIG. 2.

FIG. 5 is a diagrammatic plan view of an irrigation machine including means for regulating the amount of water supplied to the ditch.

FIG. 6 is a side elevation view of a weir including a float switch.

DETAILED DESCRIPTION OF THE INVENTION

Figure 1:
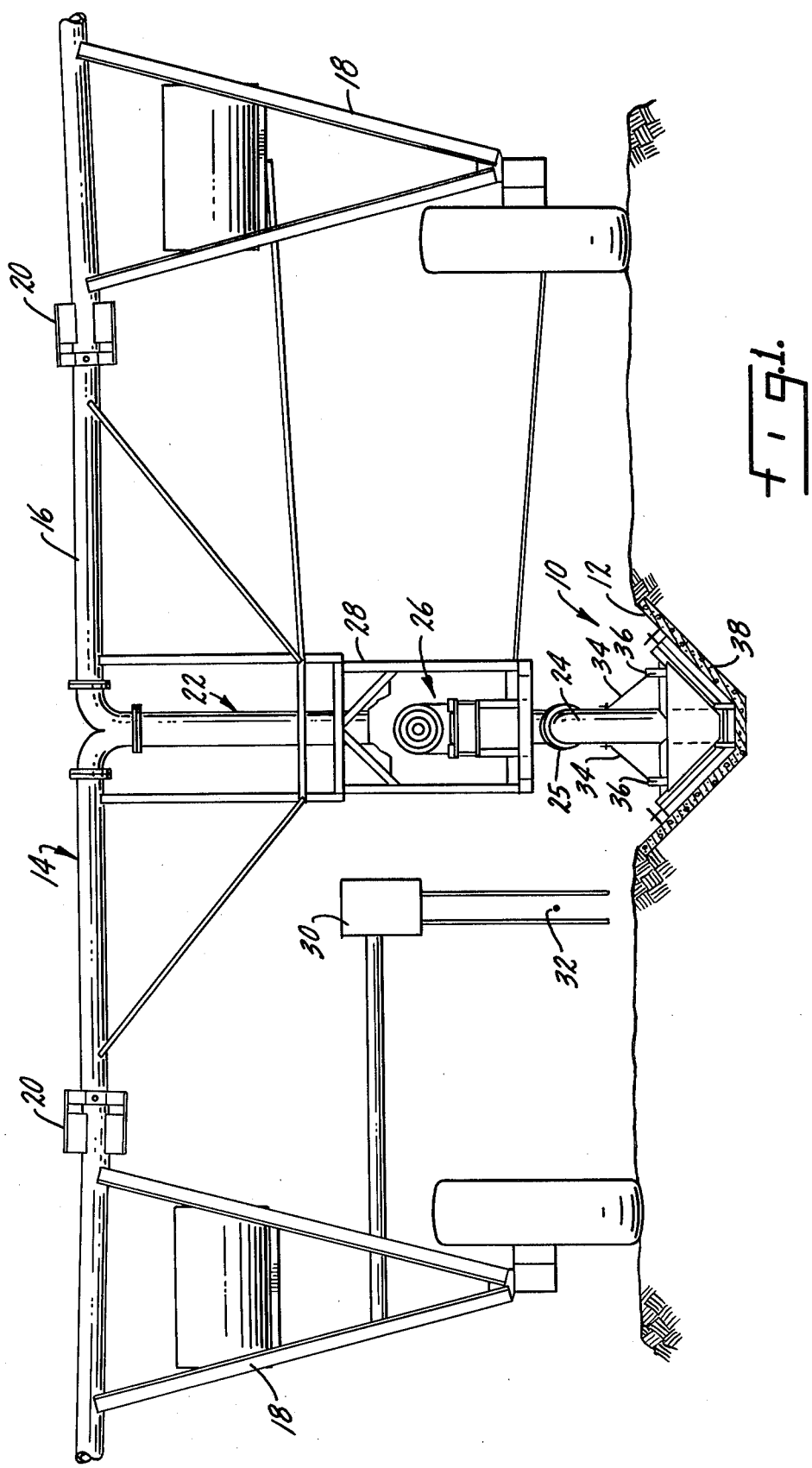
FIG. 1 is an elevation view of an irrigation machine equipped with the weir of the present invention. The view is from the downstream side of the ditch.

Present agricultural irrigation machines include two basic types, the center pivot machines and laterally mobile machines. The center pivot type has a traveling pipeline which rotates in a circle about a central pivot point. Water is supplied at the center pivot. In the laterally mobile machine, the pipeline moves in a direction perpendicular to its length. While this type of motion allows greater field coverage than a center pivot machine, it also necessitates provision of a separate water supply. This water supply must be available at all points along the path of the machine. On relatively flat ground this is most simply accomplished by use of a water supply ditch. The ditch is likely to have a natural grade from one end of the field to the other. A sloped ditch has the advantage that the flowing water tends to flush debris to one end of the ditch. Also, working with the natural grade avoids the expense of excavating a perfectly level ditch. However, the water in a sloped ditch will run to the low end, creating the problem of maintaining a sufficient depth of water at all points along the ditch.

The present invention solves this difficulty by providing a weir which controls the local depth of water in the supply ditch. The weir is attached to a laterally mobile irrigation machine and moves therewith along the ditch. Irrigation water is pumped into the ditch at the high end and its flow toward the low end is controlled by the weir. A reservoir or pool of water collects behind the weir where it can be picked up by the irrigation machine. In the following description, the term upstream will refer to that portion of the ditch from the weir to the high end of the ditch. The term downstream will refer to portions from the weir to the low end of the ditch.

FIG. 1 shows a traveling weir 10 according to the present invention. The weir is located in an irrigation water supply ditch 12. A mobile irrigation machine 14 includes a pipeline 16 supported on wheeled towers 18. The towers have some form of propulsion motors for carrying the pipeline over an area to be irrigated. The pipeline has sprinklers located thereon for distributing the irrigation water. The pipeline also has a series of flexible joints as at 20 connecting various segments that make up the pipeline. A riser line 22 provides fluid communication between the pipeline 16 and the ditch 12. The riser line may include a take-up pipe 24 which extends beneath the water level in the ditch. The take-up pipe 24 may have a flexible coupling 25 which provides flexibility in the riser line. An engine and pump set 26 held by support frame 28 may also include sensing and control means 30 for guiding the machine along the proper path. Such a path may be defined by a cable 32 extending along the direction of intended motion.

As seen in FIG. 1, the weir 10 is connected to the take-up pipe 24. The end of the take-up pipe is fastened directly to the base of the weir as will be more fully explained below. There is also a pair of brace members 34 fastened at one end to the take-up pipe 24 and at the other end to pegs 36. The pegs are fastened to the top edge of the weir. Thus it can be seen that the weir 10 will travel along the ditch with the irrigation machine 14.

The ditch 12 shown in FIG. 1 has a concrete liner 38. While this is considered the most advantageous construction for the water supply ditch, it will be understood that the present invention could be used in either lined or unlined ditches. Therefore, while the description and drawings refer to a concrete-lined ditch, some aspects of the invention are not to be limited thereto.

The weir is shown in greater detail in FIGS. 2 and 3. The weir has a rigid bulkhead 40 generally shaped to match the contour of the ditch 12. The bulkhead is supported so as to maintain clearance between the bulkhead and the surface of the ditch. A suitable clearance has been found to be on the order of 2 or 3 inches but it could be otherwise. A flexible seal 42 is attached along the bottom edge of the bulkhead. That is, it is located in the clearance or gap between the bulkhead and the ditch surface. The seal 42 engages the ditch surface to form a water tight contact which prevents water flow underneath the weir. This combination of a rigid bulkhead and a flexible seal accomplishes the twin objectives of a weir which can move in two directions along the ditch and at the same time provide a water tight contact between the weir and the ditch.

The bulkhead 40 comprises a seal-mounting frame 44 and a water-retaining wall 46. The wall 46 is fixedly attached to the downstream side of the seal-mounting frame 44. The frame 44 and wall 46 are trapezoidal in shape to generally conform to the contour of the ditch 12. The wall 46 has an angle member 48 attached to its top edge to stiffen the wall. Deflector plates 50 located on top of the angle member 48 direct any water flow over the top of the weir. The deflector plates 50 could be made vertically adjustable to vary the overall weir height. This would permit adjustment of the pool depth.

The seal-mounting frame 44 includes upstream and downstream plates 52 and 54, respectively. These are rigidly interconnected by spacers 56 (FIG. 3) and end plates 58. As best seen in FIG. 2, the upstream and downstream plates 52 and 54 comprise two side portions 60 connected by an intervening center portion 62. It will be understood however that other configurations are possible depending on the shape of the ditch. The seal-mounting frame 44 has no top or bottom enclosing the channel formed by the upstream and downstream plates 52 and 54. The significance of this will be explained below.

The seal 42 comprises three separate sections. The side sections 64 are attached to the side portions 60 of the seal-mounting frame 44. A center section 66 of the seal 42 is connected to the center portion 62 of the frame 44. All of the seal sections have a U-shaped cross section (FIG. 4). The seal has two sides 68 and a base 70. The sides 68 of the seal are connected to the seal-mounting frame 44. The seal base 70 is held in contact with the ditch surface.

The seal connection to the mounting frame 44 is best seen in FIG. 4. The sides of the seal are bolted between the upstream and downstream plates 52 and 54 and mounting straps 72. There is a mounting strap for each side and center portion of the upstream and downstream plates.

It can be seen that the seal construction and mounting arrangement permits ready replacement of worn out seals. Furthermore, separation of the seal 42 into two side sections 64 and a center section 66 permits a simplified construction. The seal sections can be fabricated from flat sheets of suitable material, such as polyurethane, the ends of which are cut to the proper angle. One result of the three-piece seal is the existence of two joints between the center and side sections. Leakage through these joints is prevented by a rubber liner or boot 74 placed on the inside surface of the seal.

The weir further includes a first set of wheels having rollers 76 attached to a sleeve 78, which is in turn mounted on an axle 80. Mounting brackets 82 which are attached to the downstream face of the water-retaining wall 46 support the axle 80. The rollers 76 engage the bottom surface of the ditch to support the weir at the proper location.

A second set of wheels includes a roller 84 at each end of the seal-mounting frame 44. The rollers 84 have a sleeve 86 mounted on an axle 88. The axle 88 is rigidly attached to an adjustment plate 90 which is in turn bolted to the end plates 58 of the mounting frame 44. The end plates have slots 92 which permit a sliding connection between the adjustment plate 90 and the end plate 58. This provides the capability of adjusting the position of the rollers 84. Thus, the gap or clearance between the bulkhead 40 and the ditch surface can be altered to vary the pressure on the seal 42.

Appropriate brackets 94 and a connecting rod 96 are provided for attachment of the take-up pipe 24.

The use, operation and function of the invention are as follows:

Irrigation water is pumped into the high end of the ditch. It runs downstream until it encounters the weir. It collects behind the weir, creating a pool of water of sufficient depth to insure the take-up pipe 24 will always be supplied with water. As the irrigation machine moves downstream the weir will move with it, allowing the pool or reservoir of water behind the weir to proceed downstream at a rate equal that of the irrigation machine. Similarly, when the machine is moving in an upstream direction, the weir assures a sufficient collection of water is available for feeding into the take-up pipe.

While the foregoing description assumes that the ditch has a continuous, end-to-end slope, obviously the weir could be adapted for use in a ditch having some other configuration. Or it could be arranged to move past stationary dams in a ditch.

The construction of the present invention is particularly advantageous in several respects. Regarding the seal configuration, it will be noted that the inside portion of the U-shaped seal is exposed to the pool of water gathered on the upstream side of the weir. This means that the head pressure of the water pool urges the base of the seal into contact with the ditch surface. Thus the seal is pressure balanced in that the head pressure tending to cause leakage underneath the seal is also tending to urge the base into contact which will prevent such leakage.

Also, the flexible seal and the clearance between the rigid bulkhead and the ditch will permit the weir to step over obstructions in the ditch. Such obstructions could include debris in the ditch or an offset between joints in the concrete liner. It will also be noted that the first and second set of wheels will assist in making the weir step over obstructions, particularly offsets in the concrete liner, without becoming snagged thereon. Furthermore, the two sets of wheels are on either side of the water-retaining wall so that no matter which direction the weir is moving, one set of wheels is in a leading position and the other is in a lagging position. It will also be noted that where the seal is initially flexed somewhat, it will have some ability to continue its sealing function even as the weir steps over an obstruction in the ditch.

The weir could also be used in combination with automatic controls for the pump that feeds water into the ditch. The weir carries a sensor for measuring the depth of the resservoir on the upstream side. Information from this sensor directs a feed pump to increase inflow when the reservoir depth drops and decrease inflow when the depth rises. The needs of the irrigation machine are met by maintaining a sufficient reservoir depth. But no water is lost due to overflow over the top of the weir.

FIGS. 5 and 6 show one possible arrangement for controlling the pump that feeds water into the ditch. The ditch pump 100 feeds water into the high end of the ditch 12. The water runs down the ditch to where it collects behind the weir 10. The weir has a float 102 that rises and falls with the depth of the reservoir behind the weir. The reservoir is shown at 104. A switch 106 is fixed near the top of the weir. The switch is connected by cable 108 to a sliding contact 110 which may be attached to the control means 30. The contact 110 slides on guide cable 32, in electrical contact therewith. Near the high end of the ditch the cable 32 is electrically connected to the ditch pump 100 through line 112. When the ditch pump supplies more water than is required by the irrigation machine 14 the level of the reservoir 104 rises. Consequently, the float 102 rises. When the reservoir level approaches the top of the weir, the float 102 actuates switch 106. This sends an electrical signal through cables 108, 32 and 112 to the ditch pump 100, shutting off the pump. When the reservoir level falls, the float deactivates switch 106, allowing the pump 100 to be restarted. This method of operation prevents water from being lost due to overflow. Alternately, the weir could carry a radio transmitter and the ditch pump could have a receiver. Reservoir depth information would be transmitted by radio signal to the pump. This information would cause the pump to operate as required to maintain the proper reservoir depth.

It will be understood that whereas a practical and operative device has been shown and described, many changes may be made in size, shape and disposition of parts without departing from the spirit and scope of the invention. For example, the first and second wheel supports could be deleted and the weir supported totally from a frame extending from the irrigation machine. It is therefore desired that the description and drawings be taken in a broad sense as illustrative and diagrammatic rather than as limiting the invention to the specific showing.

We claim:

1. In a mobile irrigation machine of the type having a traveling pipeline with sprinklers thereon for distributing water over an area to be irrigated, an open ditch for supplying water to the pipeline, a riser line providing fluid communication between the pipeline and the ditch, a weir for controlling water flow in the ditch, the weir being connected to the irrigation machine and moving therewith along the ditch, an improved weir including:
    a rigid bulkhead generally shaped to match the contour of the ditch, the bulkhead being supported so as to maintain clearance between the bulkhead and the surface of the ditch; and
    a flexible seal comprising a U-shaped member having two sides and a base, the sides being connected to the bulkhead, the base contacting the ditch surface, the top of the seal being open and exposed to the upstream side of the weir so that the head pressure of the water urges the base into contact with the ditch surface.

2. The structure of claim 1 wherein the weir further comprises at least one wheel connected to the bulkhead and engaging the ditch surface so as to maintain clearance between the ditch surface and the bulkhead.

3. The structure of claim 2 wherein the wheel has a mounting which is adjustable to vary the bulkhead-ditch clearance.

4. The structure of claim 1 wherein the bulkhead comprises a seal-mounting frame and a water-retaining wall fixedly attached to the downstream side of the seal-mounting frame.

5. The structure of claim 4 wherein the weir further includes a first set of wheels mounted for rotation and connected to the downstream face of the wall, and a second set of wheels mounted on each end of the seal-mounting frame, the first and second wheel sets engaging the bottom and sides of the ditch, respectively, to support the bulkhead at the proper clearance from the ditch surface.

6. The structure of claim 5 wherein the second set of wheels is adjustable to vary the bulkhead-ditch clearance.

7. In a mobile irrigation machine of the type having a traveling pipeline with sprinklers thereon for distributing water over an area to be irrigated, a sloped ditch for supplying water to the pipeline, a riser line providing fluid communication between the pipeline and the ditch, a weir for controlling the water flow in the ditch to create a reservoir, the weir being connected to the irrigation machine and moving therewith along the ditch, a feedwater pump for supplying water to the ditch, an improved method for regulating the inflow of water into the ditch comprising the steps of:
    (1) measuring the depth of the reservoir collected on the upstream side of the weir;
    (2) relaying reservoir depth information to the feedwater pump by the use of electric signals;
    (3) increasing the output of the feedwater pump in response to decreases in the reservoir depth; and
    (4) decreasing the output of the feedwater pump in response to increases in the reservoir depth.

8. For use with a mobile irrigation machine having a movable pipeline with sprinklers thereon operating with an open elongated ditch for supplying water to the pipeline, a movable vehicle in the pipeline and positionable at the ditch, a riser drawing water up from the ditch to the pipeline, and a dam connected to and movable with the vehicle and disposable in the ditch so as to create a pool of water and having a pressure balanced seal which is supported at two opposite sides around the lower and outer edges of the dam, the seal including a base portion flexed between the two supported sides defining a chamber which is in communication with the pool of water, the base being adapted to be disposed to engage and seal against the surface of the ditch.

9. For use with a traveling irrigation machine, a weir to be disposed in an elongated ditch and adapted to be connected to an irrigation machine so as to travel therewith, the weir including a generally upright main wall adapted to receive water from the upstream direction in the ditch so as to function as a dam, a seal disposed about the lower peripheral edge of the main wall opposite the surface of the ditch, the seal being in the form of a flexible member having the general characteristics of rubber as to flexibility and distortability and being secured to the main wall along one edge thereof and flexed into a generally U-shaped cross section, the outer surface of which opposes and contacts the surface of the ditch, and a frame in spaced relation to the main wall and connected along the other edge to hold the seal in place, the space inside the seal being in communication with the upstream side of the weir so that the pressure across the seal is balanced.

10. The structure of claim 9 further characterized in that the main wall is unitary and undivided.

11. The structure of claim 9 further characterized by and including guide wheels on the weir including at least one wheel on each side on an inclined axis to engage the sloping sides of the ditch, and another wheel adjacent the bottom of the main wall on a generally horizontal axis to engage the bottom of the ditch.

12. For use with a traveling irrigation machine, a dam adapted to be disposed in an elongated ditch in the ground and adapted to be connected to the irrigation machine so as to travel therewith, the dam including a generally upright wall, a seal around the periphery of the wall and opposed and conforming to the surface of the ditch while in contact therewith, and a chamber inside of the seal hollow in longitudinal cross section and in communication with the upstream pool formed against the dam so that the seal will be pressure balanced against the upstream side between its inside and outside thereof.

13. The structure of claim 12 further characterized in that the upright wall is unitary and undivided.

14. The structure of claim 12 further characterized by and including guide wheels on the dam including at least one wheel on each side on an inclined axis to engage the sloping sides of the ditch, and another wheel adjacent the bottom of the upright wall on a generally horizontal axis to engage the bottom of the ditch.

15. For use with a traveling irrigation machine, a weir adapted to be connected to the machine so as to travel therewith in an elongated ditch which is constructed and arranged to supply water to the irrigation machine, the weir including a dam plate conforming in outline generally to the ditch with a seal around the periphery opposing the ditch, and guide wheels on the dam plate to stabilize it and to provide movement in the ditch, the guide wheels including at least one wheel on each side on an inclined axis to engage the sloping sides of the ditch, and another wheel adjacent the bottom of the dam plate on a generally horizontal axis to engage the bottom of the ditch so as to gauge the seal to the ditch surfaces so that sealing is independent of the terrain around the ditch.

16. The structure of claim 15 further characterized by and including a seal around the periphery of the dam plate and opposing and conforming to the surface of the ditch while in contact therewith, and a chamber inside of the seal in communication with the upstream pool formed against the dam plate so that the seal will be pressure balanced between its inside and outside.

17. The structure of claim 15 further characterized in that the dam plate is unitary and undivided.

* * * * *